No. 836,912. PATENTED NOV. 27, 1906.
M. A. BECK.
AUTOMATIC LOAD BRAKE.
APPLICATION FILED SEPT. 7, 1906.
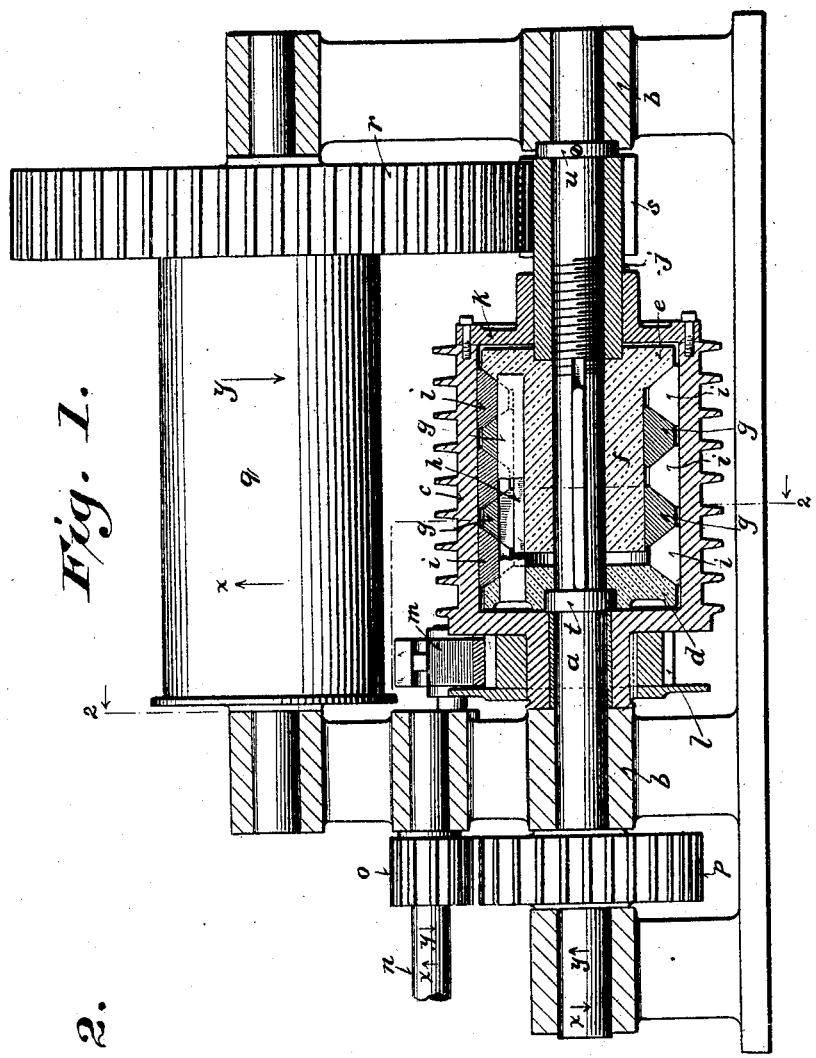
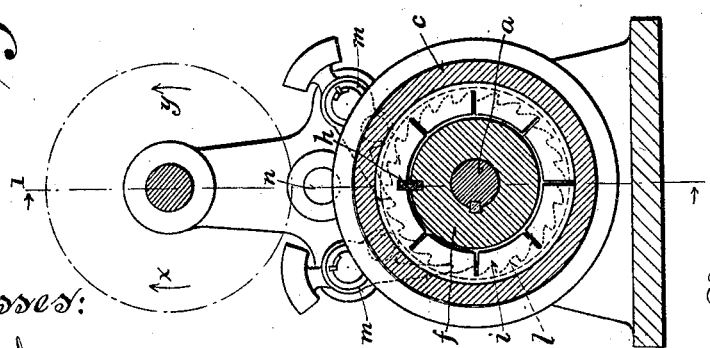

UNITED STATES PATENT OFFICE.

MATTHIAS A. BECK, OF MILWAUKEE, WISCONSIN.

AUTOMATIC LOAD-BRAKE.

No. 836,912.  Specification of Letters Patent.  Patented Nov. 27, 1906.

Application filed September 7, 1906. Serial No. 333,627.

*To all whom it may concern:*

Be it known that I, MATTHIAS A. BECK, a citizen of the United States, residing at Milwaukee, in the county of Milwaukee and State of Wisconsin, have invented certain new and useful Improvements in Automatic Load-Brakes, of which the following is a specification, reference being had to the accompanying drawings, forming a part thereof.

This invention relates more particularly to brakes for hoists and similar machines of the class of that shown and described in United States Letters Patent No. 697,393, dated April 8, 1902.

The main objects of the present invention are to automatically control with certainty and precision the descent of the load by the operation of the motor, to avoid collar or radial surface friction during the operation of lowering a load, to equally distribute the pressure on the friction-surfaces, to secure uniformity of rubbing velocity for the entire active surface of the brake, and generally to improve the construction and operation of brakes of this class.

The invention consists in certain novel features of construction and in the peculiar arrangement and combinations of parts, as hereinafter particularly described, and pointed out in the claims.

In the accompanying drawings like characters designate the same parts in both figures.

Figure 1 is a vertical axial section of the brake on the line 1 1, Fig. 2, as applied to a hoist; and Fig. 2 is a vertical cross-section on the broken line 2 2, Fig. 1.

The brake-shaft $a$, passing continuously through the brake, is supported at each end thereof in bearings $b$. On this shaft is loosely mounted a cylindrical friction-shell $c$. Within this shell two beveled expanding heads $d$ and $e$ are mounted on the shaft $a$ and have a feather or other driving connection therewith, the head $e$ being movable axially toward and from the head $d$. The head $e$ has a cylindrical hub or extension $f$, on which are mounted one or more externally-beveled and axially-movable expanding rings $g$, which are made to turn therewith by a key $h$ or other suitable means.

Between the opposing beveled faces of the heads $d$ and $e$ and of the several expanding rings $g$ are interposed internally-beveled expansible friction-rings $i$, the outer cylindrical faces of which are fitted in the shell $c$. These rings are completely severed on one side and are preferably partially severed at intervals, as shown in Fig. 2, to enable them to conform more readily to the shell $c$ when they are expanded therein. At the end of the brake next to the head $e$ a sleeve $j$ is threaded thereon. The adjacent end of the shell $c$ is provided with a detachable head $k$, which has a hub fitted to turn on said sleeve. At the opposite end of the brake a ratchet-wheel $l$ is attached to the shell, and pawls $m$, pivoted to an adjacent part of the frame, hold said shell against turning in one direction, while they permit it to turn freely in the other direction. A motor or driving-shaft $n$ is connected with the brake-shaft $a$ by a pinion $o$ and gear $p$. In the present case a hoisting-drum $q$ is connected by a gear $r$ with a pinion $s$ on the sleeve $j$. Between the beveled expanding head $d$ and the adjacent head of the shell $c$ the brake-shaft $a$ is formed or provided with a collar $t$, and between the outer end of the sleeve $j$ and the adjacent bearing $b$ said shaft is formed or provided with a collar $u$.

In connection with a hoist the improved brake herein shown and described operates as follows: In hoisting a load the motor or driving-shaft $n$, being turned in the direction indicated by the arrow $x$, turns the brake-shaft $a$ and the hoisting-drum $q$ in directions indicated by correspondingly-designated arrows. When the shaft $a$ is turned in the direction indicated by the arrow $x$ thereon, it operates, primarily, to screw the sleeve $j$ against the head $e$, thereby forcing it toward the head $d$ and by the interengagement of the beveled faces of said heads and of the rings $g$ and $i$ expanding the rings $i$ against the inclosing shell $c$. The rings $i$ being thus expanded and held in fast frictional engagement with the shell $c$, the several parts of the brake, including the shell $c$ and sleeve $j$, are turned with the shaft $a$. In lowering the load, which tends to turn the hoisting-drum $q$ and the parts of the brake in the directions indicated by the arrows $y$, the shell $c$ is prevented from turning by engagement of the pawls $m$ with the ratchet-wheel $l$. The motor or driving-shaft $n$ being turned in the direction indicated by the arrow $y$ thereon tends to screw the sleeve $j$ on the shaft $a$ away from the head $e$, and thereby to release or reduce the frictional engagement between the rings $i$ and the shell $c$, permitting said rings to slip in the stationary shell and the load to descend at a rate corresponding with the speed of the motor or driving-shaft $n$. If the motor or driving-shaft is stopped, the descent of the load will be instantly arrested by its action upon the screw-threaded sleeve $j$, tending to expand the rings $i$ in the shell $c$. The heavier the load the greater will be the force tending to expand the friction-rings $i$ and the stronger will be the hold of the brake.

It will be observed that the movement of the load both in lifting or lowering it is positively governed by the operation of the motor or driving-shaft, backward rotation of said shaft being necessary to release or reduce the hold of the brake and permit the load to descend. It will also be observed that in the operation of the brake there is little or no end thrust of the brake-shaft $a$ in its bearings, and consequently no radial surface or collar friction, that the pressure against the opposing friction-surfaces of the brake is equally distributed, and that a uniform rubbing velocity is secured, the entire active surface of the brake being of the same or uniform radius.

For some purposes it is desirable to reverse the connections of the motor and the load—viz., to gear the motor with the sleeve $j$ and the load with the shaft $a$, the construction and operation of the brake remaining essentially the same as hereinbefore described.

I claim—

1. In an automatic load-brake the combination of a shaft having two expanding heads mounted thereon, one of said heads being movable axially toward and from the other, an expansible friction-ring between said heads, a shell surrounding said ring and free to turn in one direction, and means for holding said shell against turning in the opposite direction, substantially as described.

2. In an automatic load-brake the combination of a shaft having beveled heads mounted thereon, one head being movable axially toward and from the other, an expansible beveled friction-ring interposed between said heads, a shell surrounding said ring and free to turn in one direction, and means for holding said shell against turning in the opposite direction, substantially as described.

3. In an automatic load-brake the combination of a shaft, opposing beveled heads mounted thereon and having rotating connection therewith, one head being movable axially with relation to the other, a number of internally-beveled and expansible friction-rings confined between said heads, an externally-beveled expanding ring interposed between the friction-rings, a friction-shell surrounding said rings and free to rotate therewith in one direction, and means for preventing said shell from turning in the other direction, substantially as described.

4. In an automatic load-brake the combination of a shaft, beveled heads mounted thereon and having rotating connection therewith, one head being movable axially with relation to the other, a number of internally-beveled expansible friction-rings and one or more externally-beveled expanding rings confined side by side between said heads and upon the extended hub of one head, a friction-shell surrounding said rings, and free to turn therewith in one direction, and means for preventing said shell from turning in the other direction, substantially as described.

5. In an automatic load-brake the combination of a shaft, beveled heads mounted thereon and having rotating connection therewith, one head being movable axially with relation to the other, one or more beveled expansible friction-rings interposed between said heads, a friction-shell surrounding said ring and free to turn therewith in one direction, means for preventing said shell from turning in the other direction and a sleeve threaded upon said shaft adjacent to the movable head, substantially as described.

6. In an automatic load-brake the combination of a shaft, opposing beveled heads mounted upon and having rotating connection with said shaft, one head being axially movable relatively to the other, a beveled expansible friction-ring interposed between said heads, a friction-shell surrounding said ring and free to turn therewith in one direction, means for preventing said shell from turning in the other direction and a sleeve threaded on said shaft adjacent to the movable head, said sleeve and the other head being confined between collars or shoulders on said shaft, substantially as described.

In witness whereof I hereto affix my signature in presence of two witnesses.

MATTHIAS A. BECK.

Witnesses:
 CHAS. L. GOSS,
 ZAYDA G. DALTON.